United States Patent [19]

Chen

[11] Patent Number: 5,167,425
[45] Date of Patent: Dec. 1, 1992

[54] MEANS FOR USE IN REVERSING FRONT SEAT OF A MULTI-SEAT STROLLER

[76] Inventor: Shih-Shyan Chen, No. 50, Jen Hua Rd., TA-LI Hsiang, Taichung Hsien, Taiwan

[21] Appl. No.: 689,431

[22] Filed: Apr. 23, 1991

[51] Int. Cl.⁵ .............................................. B62B 7/08
[52] U.S. Cl. .................................. 280/648; 280/47.4; 280/643; 297/355
[58] Field of Search ................. 280/47.39, 47.4, 47.36, 280/47.38, 47.35, 643, 648, 650, 642; 297/245, 355

[56] References Cited

U.S. PATENT DOCUMENTS

| 4,886,289 | 12/1989 | Yee et al. | 280/47.4 |
| 5,018,754 | 5/1991 | Cheng | 280/47.4 |

FOREIGN PATENT DOCUMENTS 3007888 9/1981 Fed. Rep. of Germany ..... 280/47.4

Primary Examiner—David M. Mitchell
Attorney, Agent, or Firm—Browdy and Neimark

[57] ABSTRACT

An apparatus for use in reversing front seat of a multi-seat stroller comprises a seat, two parallel arms, two joint members, two connection members, and a backrest. The seat is mounted on a predetermined position of two parallel branch tubes located at lower side of the framework of the stroller. The two parallel arms are pivotally mounted on two parallel branch tubes at the position corresponding to the center of the seat. Two joint members are separately and pivotally mounted on the free ends of two parallel arms. Two connection members are pivotally mounted under the two joint members so that two joint members can be detachably fastened to the two parallel branch tubes. The backrest is pivotally mounted at lower ends of both sides thereof to the two joint members in such a manner that the pivotal angle of the backrest and the seat can be adjusted.

2 Claims, 4 Drawing Sheets 5,167,425

MEANS FOR USE IN REVERSING FRONT SEAT OF A MULTI-SEAT STROLLER

BACKGROUND OF THE INVENTION

The present invention relates to a stroller, and more particularly to a multi-seat stroller designed with means to reverse the front seat thereof.

The stroller is generally classified by the number of seat available as a single-seat stroller or a multi-seat stroller. As is often the case, a multi-seat stroller has two seats mounted thereon, which facilitate two small children to seat face to face so that they can play together easily. However, the situation can occasionally develop to call for two children to be seated in the stroller in such a way that they all face the same direction in which the stroller is moving. This can not be easily done, because the front seat of the stroller is generally fixed and can not be reversed.

SUMMARY OF THE INVENTION

It is, therefore, the primary objective of the present invention to provide a multi-seat stroller with a means to reverse its front seat to permit a child sitting thereon to face forward or backward as desired.

It is another objective of the present invention to provide a multi-seat stroller with a means, which is of simple and ingenious construction and is easy to use, to reverse front seat thereof.

In keeping with principles of the present invention, the primary objectives of the present invention are accomplished by a means for use in reversing front seat of a multi-seat stroller, which is characterized in that it comprises a seat, two parallel arms, two joint members, two connection members, and a backrest. The seat is mounted on a predetermined position of two parallel branch tubes located at lower side of the framework of the stroller. The two parallel arms are pivotally mounted on two parallel branch tubes at the position corresponding to the center of the seat. Two joint members are separately and pivotally mounted on the free ends of two parallel arms. Two connection members are pivotally mounted under the two joint members so that two joint members can be detachably fastened to the two parallel branch tubes. The backrest is pivotally mounted at lower ends of both sides thereof to the two joint members in such a manner that the pivotal angle of the backrest and the seat can be adjusted.

DETAILED DESCRIPTION OF THE PREFERRED EMBODIMENTS

Figure 1:
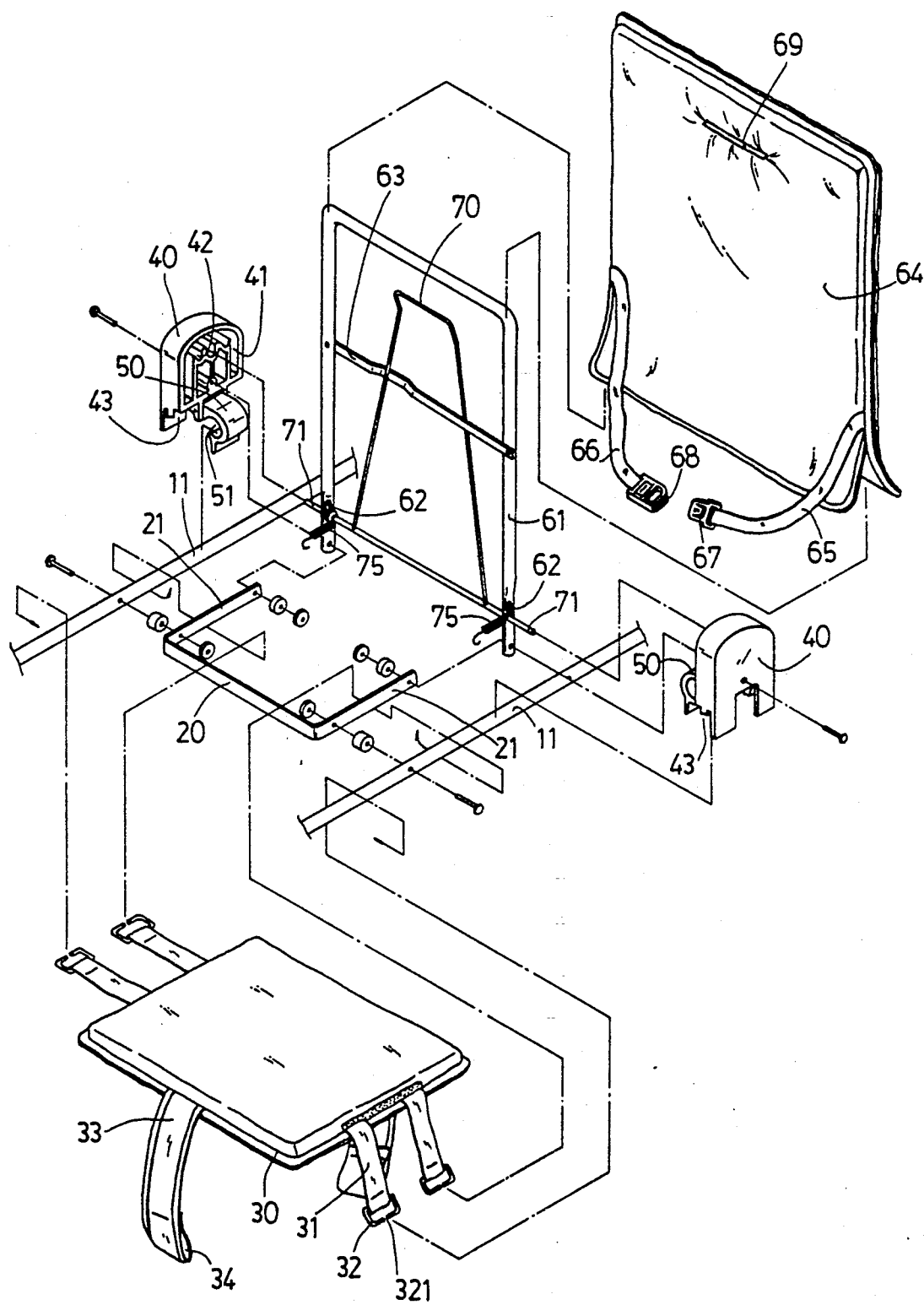
FIG. 1 shows an exploded view of the preferred embodiment of the present invention.
Figure 2:
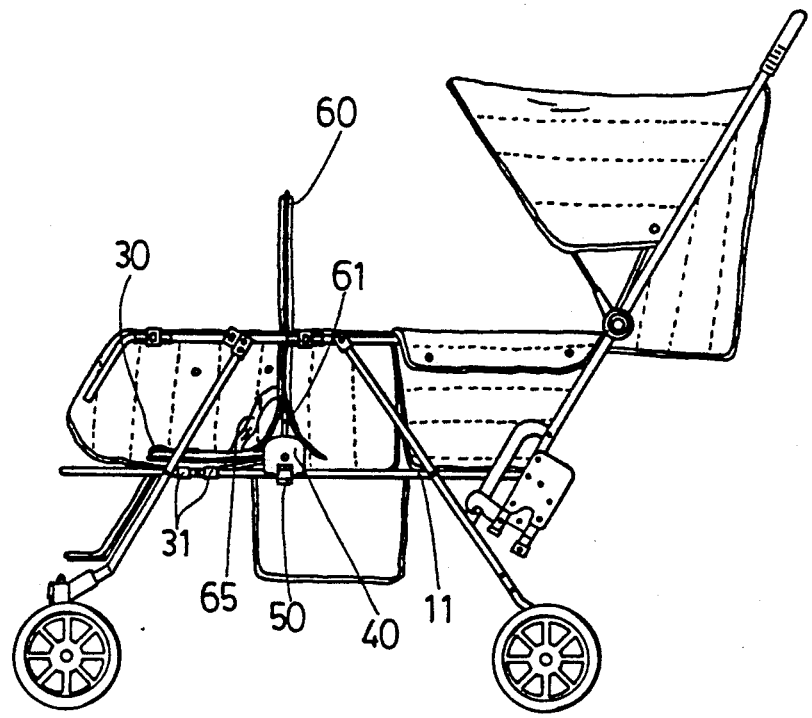
FIG. 2 shows a schematic side view of a two-seat stroller incorporating the preferred embodiment of the present invention as shown in FIG. 1.
Figure 3:
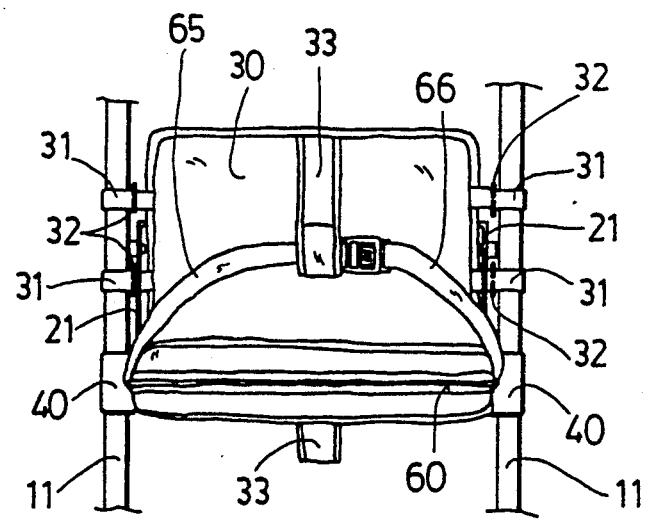
FIG. 3 is a top view of the preferred embodiment as shown in FIG. 2, showing the seat in a fastening state.

Referring to FIGS. 1-3, the front seat of the stroller embodied in the present invention is shown comprising an oscillating piece 20, a seat 30, two joint members 40, two connection members 50, a backrest 60, an arrester 70, and two elastic members 75.

The oscillating piece 20 is of a U-shaped construction with two parallel arms 21 disposed thereto. The inner ends of the two parallel arms 21 are pivotally mounted in the inner sides of the two parallel branch tubes 11 located under the framework of the stroller. The parallel arms 21 are capable of oscillating by using the pivot joint as pivot axis.

The width of seat 30 is slightly narrower than the distance separating two parallel arms 21. The seat 30 comprises two fastening belts 31 disposed at both lateral sides thereof, with each of fastening belts 31 having a fastening piece 32 attached thereto. In addition, the seat 30 also includes a strap 33 attached respectively to front and rear sides thereof, with each of straps 33 having an earhole 34 disposed at the terminal portion thereof. The seat 30 is lodged in the center of the oscillating piece 20 so as to permit the fastening belts 31 to traverse the upper portions of the two parallel tubes 11 via both sides of the two parallel arms 21 in order to gyrate downwardly and inwardly to intertwine the branch tubes 11 to pass through the fastening belt 31 via the indentation 321 of fastening piece 32 so that the seat 30 is fastened securely to the two parallel branch tubes 11.

Two joint members 40 are separately and pivotally arranged on the free ends of two parallel arms 21 of the oscillating piece 20. Each of joint members 40 comprises therein a circular arc guide groove 41 and a predetermined number of arresting grooves 42. In addition, the joint members 40 comprise lap connections 43 disposed at bottoms thereof for use in fastening the joint members 40 to branch tubes 11.

The two connection members 50 are separately and pivotally arranged at the inner sides located under two joint members 40. The body of connection member 50 comprises a circular arc fastening groove 51 for use in holding the branch tube 11 securely in such a manner that two joint members 40 are detachably fastened and oriented.

The backrest 60 comprises an inverted U-shaped tube frame 61 and a cushion 64. Both ends of the tube frame 61 are pivotally mounted to two joint members 40 at the positions corresponding to the center of the circular arc guide groove 41. An elongated hole 62 is disposed above the pivot joint of the tube frame 61. A reinforcing piece 63 is mounted between the two parallel arms of the tube frame 61. The cushion 64 is arranged on the tube frame 61 and has straps 65 and 66 attached thereto at the lower edges of two opposing sides thereof. The male fastener 67 and the female fastener 68 are respectively attached to the strap 65 and the strap 66. The straps 65 and 66 pass through the earhole 34 of the strap 33 of seat 30 and are locked up by means of male and female fasteners 67 and 68. In addition, the cushion 64 comprises a through hole 69 disposed near the upper edge thereof.

The arrester 70 of a ladder-shaped is mounted across both sides of the reinforcing piece 63 and comprises two arresting portions 71 extending out horizontally from both ends thereof. These two arresting portions 71 traverse respectively the two elongated holes of the tube frame 61 and are subsequently received in the guide grooves 41 of the two joint members 40 and can be further embedded in the arresting groove 42.

The two elastic members 75 are in fact two coiled springs, which are fastened at one end thereof to the inner side of arresting portions 71 of the arresters 70 and are fastened at other end thereof to the pivot joint of the tube frame 61 so as to force the arrester 70 to remain embedded in the arresting groove 42 to stabilize the pivotal angle formed by the backrest 60 and the seat 30.

Figure 4:
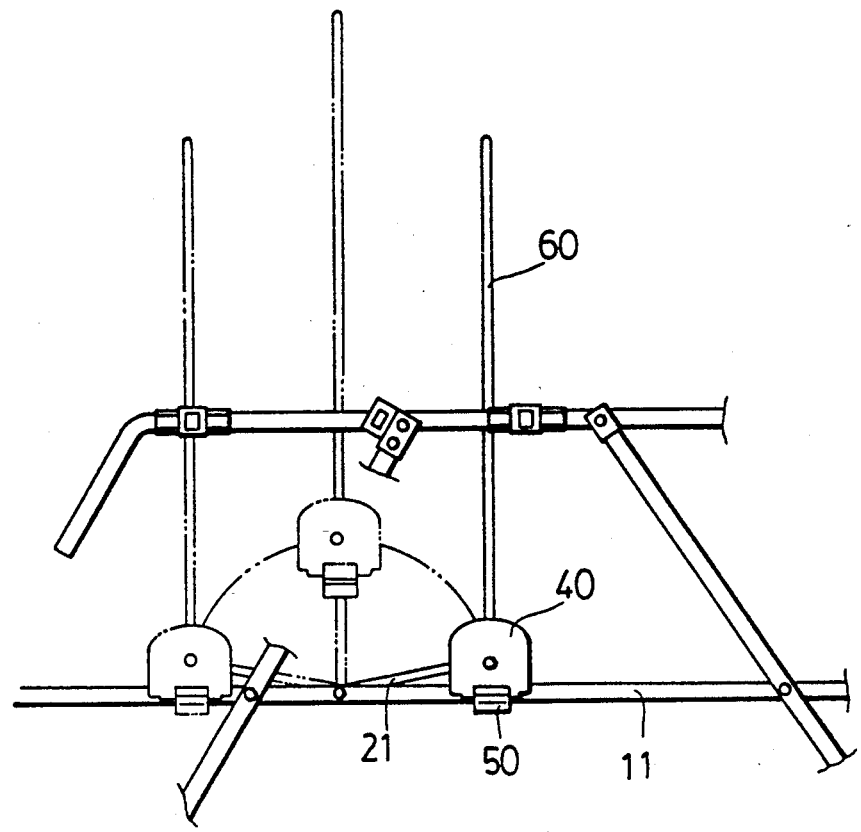
FIG. 4 shows a reversing scheme of the preferred embodiment of the present invention.
Figure 5:
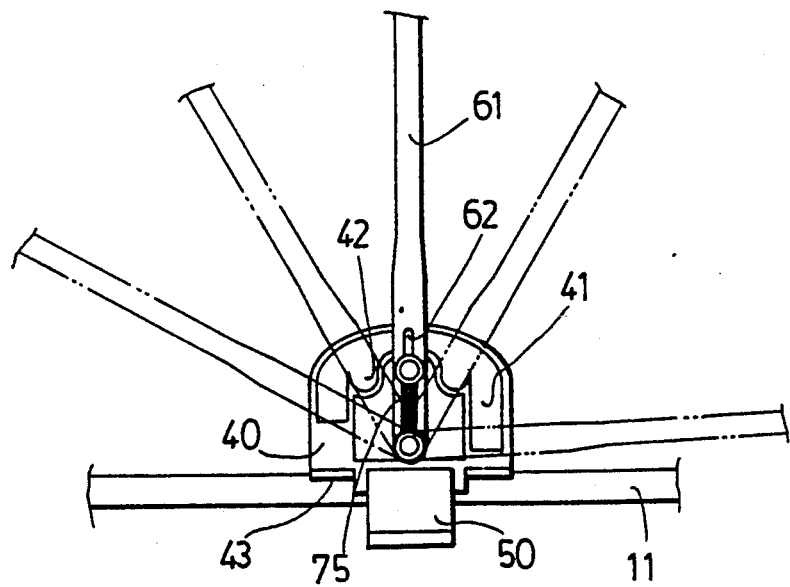
FIG. 5 shows a schematic view of the hinge members of the preferred embodiment of the present invention.

The method of adjusting and reversing the angle of the seat embodied in the present invention is illustrated by FIGS. 4 and 5.

As shown in FIG. 4, the front seat, which is originally facing forward, can be reversed to face backward by drawing inwardly the two connection members 50 to become detached from the branch tube 11. Thereafter, the backrest 60 is turned over to one side of the seat 30 by using the oscillating piece 20 as a revolving arm so as to permit the lap connections 43 of the joint members 40 to couple again with the branch tubes 11. The two connection members 50 are pulled outwardly to be fastened with the branch tubes 11 to complete the process of reversing the front seat.

FIG. 5 illustrates the method of adjusting the pivotal angle of the backrest 60 and the seat 30. The hand is inserted into the through hole 69 of the cushion 64 to grab the arrester 70, which is subsequently lifted to allow the two arresting portions 71 to disengage with the arresting groove 42 of joint member 40 so as to be received in the guide groove 41. The backrest 60 can be now adjusted to a desired angle. Thereafter, the arrester 70 is released to move downward to be locked up in the arresting groove 42 by virtue of the recoil force of the two elastic members 75. Thus the angle adjustment of the backrest 60 is completed.

Figure 6:
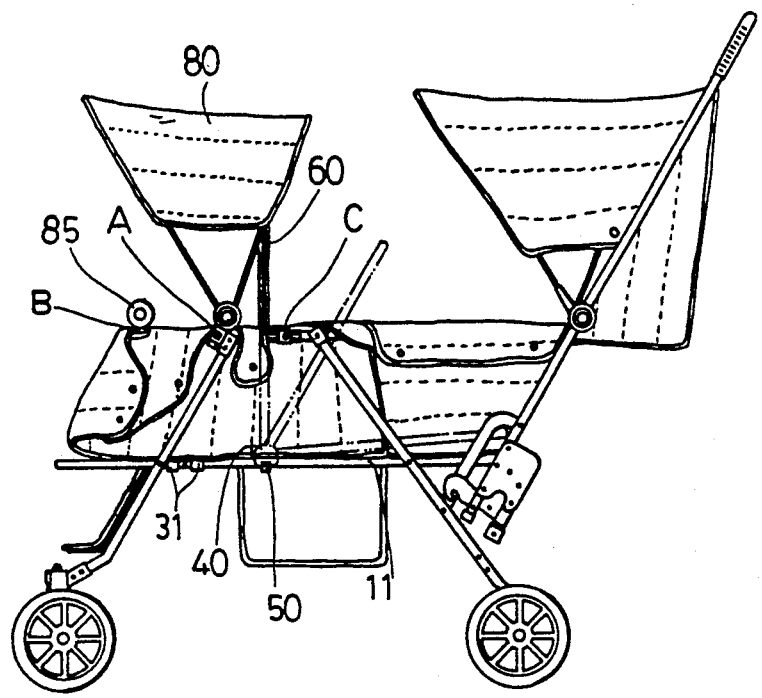
FIG. 6 shows a side view of a two-seat stroller, which has a front seat facing forward and incorporates thereinto the preferred embodiment of the present invention.
Figure 7:
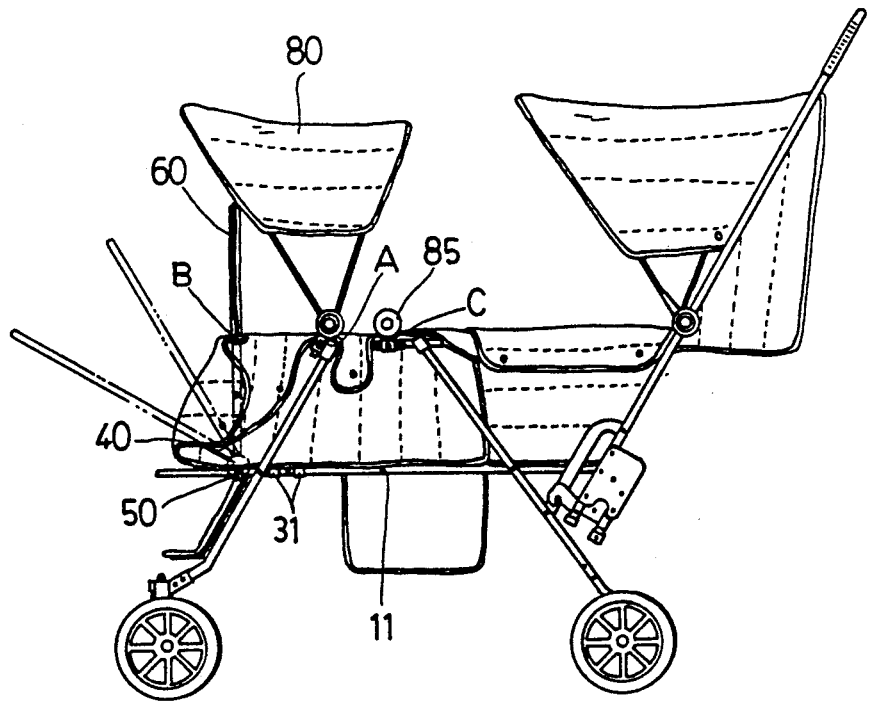
FIG. 7 shows a side view of a two-seat stroller, which has a front seat facing backward and incorporates thereinto the preferred embodiment of the present invention.

FIGS. 6 and 7 illustrate the application of the preferred embodiment of the present invention to a two-seat stroller.

As shown in FIG. 6, the framework of the stroller with a front seat facing forward is composed of receptacles A, B, and C. The receptacle A is for use in mounting a sunshade 80 while the receptacle B is used to install a handle 85 for a child rider to hold on to.

As shown in FIG. 7, when the front seat facing forward is reversed to face backward, the position of the handle 85 is shifted accordingly to the receptacle C for the convenience of a child rider to hold on to.

The embodiment of the present invention described above is to be considered in all respects as merely an illustration of principles of the present invention. Accordingly, the present invention is to be limited only by the scope of the hereinafter appended claims.

What I claim is:

1. Apparatus for use in reversing front seat of a multi-seat stroller, comprising:
    (a) a seat mounted on two parallel branch tubes located at a lower side of the framework of the stroller;
    (b) a backrest;
    (c) two joint members mounted separately on lower sides of said backrest;
    (d) two parallel arms with one end thereof being pivotally mounted on the center of said joint member and with another end thereof being pivotally mounted on said two parallel branch tubes at a position corresponding to the center of said seat;
    (e) two connection members integrally formed separately under said joint members for detachably securing said joint members to said parallel branch tubes located at lower side of said framework;
    (f) two elastic members respectively mounted at first ends to said lower sides of said backrest and at second ends to an arrestor rod slidably mounted on said backrest;
    (g) wherein respective ends of said arrestor rod are held in engagement in said two joint members by said two elastic members; and
    (h) wherein said two parallel arms can be rotated on said two parallel branch tubes to relocate said backrest and after rotation be securely engaged to each of said two parallel tubes by each of said two connection member.

2. Means for use in reversing front seat of a multi-seat stroller in accordance with claim 1, wherein said joint members further comprise circular arc guide grooves and a predetermined number of arresting grooves disposed therein, wherein said ends of said arrestor rod are received separately in said guide grooves and are detachably held in said guide grooves in said arresting grooves by said two elastic members; wherein said backrest can be adjusted to different positions when said two connector members are fixed to said two parallel branch tubes.

* * * * *